US012756264B2

(12) United States Patent
Nishizawa et al.

(10) Patent No.: US 12,756,264 B2
(45) Date of Patent: Oct. 6, 2026

(54) BRUSHLESS MOTOR

(71) Applicant: MABUCHI MOTOR CO., LTD., Chiba (JP)

(72) Inventors: Katsuhito Nishizawa, Chiba (JP); Shou Kubota, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 237 days.

(21) Appl. No.: 18/171,667

(22) Filed: Feb. 21, 2023

(65) Prior Publication Data

US 2023/0275487 A1 Aug. 31, 2023

(30) Foreign Application Priority Data

Feb. 28, 2022 (JP) ................................. 2022-029927

(51) Int. Cl.
*H02K 5/22* (2006.01)
*H02K 11/33* (2016.01)

(52) U.S. Cl.
CPC ............. *H02K 5/225* (2013.01); *H02K 11/33* (2016.01)

(58) Field of Classification Search
CPC ..... H02K 5/225; H02K 2203/09; H02K 11/33
USPC ............................................................ 310/71
See application file for complete search history.

(56) References Cited

U.S. PATENT DOCUMENTS 5,770,902 A * 6/1998 Batten .................... H02K 5/225 310/68 E
5,861,689 A * 1/1999 Snider .................... H02K 3/522 310/71
11,791,685 B2 * 10/2023 Kim ....................... H02K 7/083 310/71
2004/0155540 A1 8/2004 Nakamura et al.
2006/0086201 A1 * 4/2006 Weldon .................. G05G 1/405 74/512

(Continued)

FOREIGN PATENT DOCUMENTS

DE 202009007545 U1 11/2010
DE 102021121879 A1 3/2022

(Continued)

OTHER PUBLICATIONS

Machine Translation of Okubo JP 201706310 (Year: 2017).*

(Continued)

*Primary Examiner* — Christopher M Koehler
(74) *Attorney, Agent, or Firm* — HAUPTMAN HAM, LLP

(57) ABSTRACT

A brushless motor where a stator and a rotor are housed in a housing, includes: three busbars located on one end side of the stator in an axial direction, the three busbars connecting three-phase coils provided to the stator on a per-phase basis; three output terminals on the one end side of the busbars, the three output terminals extending in the axial direction while being electrically continuous with the busbars; and a compatible component having: a holder portion placed on the one end side of the busbars in the housing and supported by the housing; and terminals each electrically connected to the respective output terminal and exposed to an outside of the housing. A plurality of types of the compatible components that have the common holder portion and are different in the configuration of the terminals is prepared, and one of the plurality of types is supported by the housing.

4 Claims, 8 Drawing Sheets

(56) References Cited

U.S. PATENT DOCUMENTS

| | | | | |
|---|---|---|---|---|
| 2008/0026617 | A1 * | 1/2008 | Boischio | H01R 31/06 439/157 |
| 2011/0006625 | A1 * | 1/2011 | Fujii | H02K 3/522 310/68 B |
| 2013/0038153 | A1 * | 2/2013 | Asahi | H02K 5/225 310/71 |
| 2013/0234548 | A1 * | 9/2013 | Oishi | H02K 29/08 29/598 |
| 2016/0036306 | A1 * | 2/2016 | Yamasaki | H02K 5/225 310/71 |
| 2017/0151976 | A1 * | 6/2017 | Asao | H02K 11/028 |
| 2017/0201152 | A1 * | 7/2017 | Haga | H02K 11/215 |
| 2017/0302123 | A1 | 10/2017 | Kobayashi et al. | |
| 2018/0375400 | A1 | 12/2018 | Ahrens et al. | |
| 2021/0075301 | A1 * | 3/2021 | Ichikawa | H02K 16/04 |
| 2021/0339794 | A1 * | 11/2021 | Kawaguchi | H02K 5/225 |
| 2022/0037967 | A1 * | 2/2022 | Yamaguchi | H02K 11/33 |
| 2022/0069666 | A1 | 3/2022 | Shiraki et al. | |
| 2022/0263381 | A1 | 8/2022 | Matsuda et al. | |
| 2023/0155450 | A1 * | 5/2023 | Park | B60T 13/741 310/71 |

FOREIGN PATENT DOCUMENTS

| | | | | |
|---|---|---|---|---|
| FR | 2805675 | A1 * | 8/2001 | H02K 5/225 |
| JP | H0730568 | U * | 6/1995 | |
| JP | 2004248354 | A | 9/2004 | |
| JP | 2017063610 | A * | 3/2017 | |
| JP | 2017192227 | A | 10/2017 | |
| JP | 2019506124 | A | 2/2019 | |
| JP | 2021027688 | A | 2/2021 | |
| WO | WO-2013065577 | A1 * | 5/2013 | H02K 29/12 |
| WO | 2020098552 | A1 | 5/2020 | |

OTHER PUBLICATIONS

Machine Translation of Ikeno WO 201306577 (Year: 2013).*
FR 2805675 Machine Translation (Year: 2001).*
JP H0730568 Machine Translation (Year: 1995).*
Office Action in JP Application No. 2022-029927, mailed Dec. 2, 2025, 6pp.
Office Action in JP Application No. 2022-029927, dated Sep. 2, 2025, 6pp.
Office Action in DE Application No. 102023104854.6 dated Jun. 30, 2026, 8pp.

* cited by examiner

BRUSHLESS MOTOR

RELATED APPLICATIONS

The present application claims priority to Japanese Application No. 2022-029927 filed Feb. 28, 2022, the disclosure of which is hereby incorporated by reference herein in its entirety.

BACKGROUND

Technical Field

The present disclosure relates to a brushless motor where a stator and a rotor are housed in a housing.

Related Art

Conventionally, a motor is provided with a terminal (conductive terminal) that is connected to a power feeding device that feeds power from the outside to the motor. An interface specification of the terminal may vary according to the customer. The terminal is changed into various configurations to adapt the terminal to the requested interface specifications. Hence, the motor is requested to be configured in such a manner that the terminal configuration can be easily changed to meet the specification of a customer. Various methods have heretofore been proposed. For example, DE Utility Model No. 202009007545 discloses a brushed motor that is adaptable to a requested specification by pressing a connector provided separately from a brush holder, from the outside of the brush holder, to form a shape that fits.

SUMMARY

If a connector is configured as an attachment that is a retrofittable separate body from a brush holder as in DE Utility Model No. 202009007545 above, the number of components that are handled separately from a motor main body increases. In other words, a brushed motor, such as in DE Utility Model No. 202009007545 above, has room for improvement from the viewpoint of costs and handling since the number of components increases by one to enable changes to a connector (terminal configuration) in accordance with the specification of a customer. A request to enable an easy change of the terminal configuration in accordance with the specification, such as described above, is also similarly made for a brushless motor.

One object of the present disclosure is to provide a brushless motor that has been created in light of the above problems and can efficiently and easily comply with interface demands that vary according to the customer. Note that the present disclosure is not limited to this object, and it is also possible to position, as another object of the present disclosure, achieving functions and effects that are derived from each configuration illustrated in "DETAILED DESCRIPTION" to be described later, the functions and effects being hardly obtained by conventional techniques.

(1) A brushless motor disclosed herein is a brushless motor where a stator and a rotor are housed in a housing, including: three busbars located on one end side of the stator in an axial direction, the three busbars connecting three-phase coils provided to the stator on a per-phase basis; three output terminals on the one end side of the busbars, the three output terminals extending in the axial direction while being electrically continuous with the busbars; and a compatible component having: a holder portion placed on the one end side of the busbars in the housing and supported by the housing; and terminals each electrically connected to the respective output terminal and exposed to an outside of the housing. A plurality of types of the compatible components that have the common holder portion and are different in the configuration of the terminals is prepared, and one of the plurality of types is supported by the housing.

(2) It is preferable that each of the output terminals extend from the respective busbar toward the one end side. Moreover, it is preferable that the holder portion be stacked on the one end side of the three busbars, and include a hole portion through which the output terminals are inserted, the hole portion passing through the holder portion in the axial direction.

(3) It is preferable that the compatible component include a connector portion where end portions, which are exposed to the outside, of the terminals are placed. In this case, it is preferable that the connector portion be placed adjacent to the housing on the outside, and that the three output terminals be provided in such a manner as to congregate in a circumferential position where the connector portion is located and to be spaced apart in a circumferential direction.

(4) In a case of (3) above, it is preferable that the connector portion have a different configuration according to the type of the compatible component.

(5) It is preferable that the compatible component include an insulating lid portion having a shape covering the holder portion from the one end side, the insulating lid portion being formed integrally with a part of the connector portion.

The brushless motor of the present disclosure can efficiently and easily comply with interface demands that vary according to the customer.

DETAILED DESCRIPTION

A brushless motor as an embodiment is described with reference to the drawings. The embodiment that appears below is a mere example, and is not intended to exclude various modifications and technical applications, which are not specified in the following embodiment. Each of configurations of the embodiment can be carried out with various modifications within a scope that does not depart from a gist of the configuration. Moreover, it is possible to make the choice of which configuration to use as needed, or the configurations can be combined as appropriate.

[1. Entire Configuration]

Figure 1:
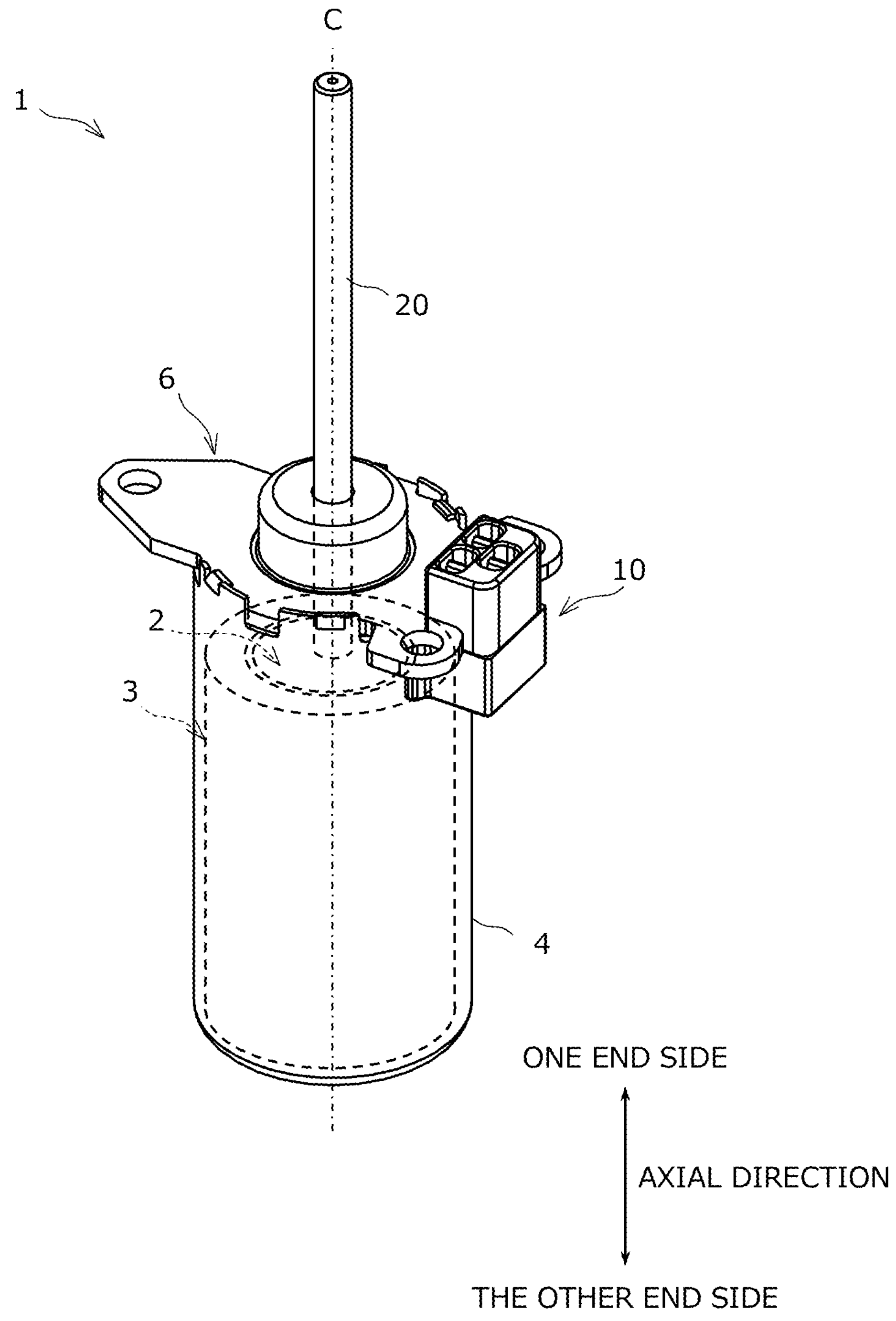
FIG. 1 is a perspective view of a brushless motor according to an embodiment.

FIG. 1 is a perspective view of a brushless motor 1 (hereinafter referred to as the "motor 1") according to the embodiment. As illustrated in FIG. 1, the motor 1 is configured in such a manner as to house a rotor 2 to which a shaft 20 is fixed, and a stator 3 fixed to a housing 4 being a shell of the motor 1, in the housing 4. An inner rotor brushless DC motor where the rotor 2 is placed in the center of the cylindrical stator 3 is illustrated by example in the embodiment. The rotor 2, the stator 3, and the housing 4 are placed coaxially with a central axis C of the motor 1.

Figure 2:
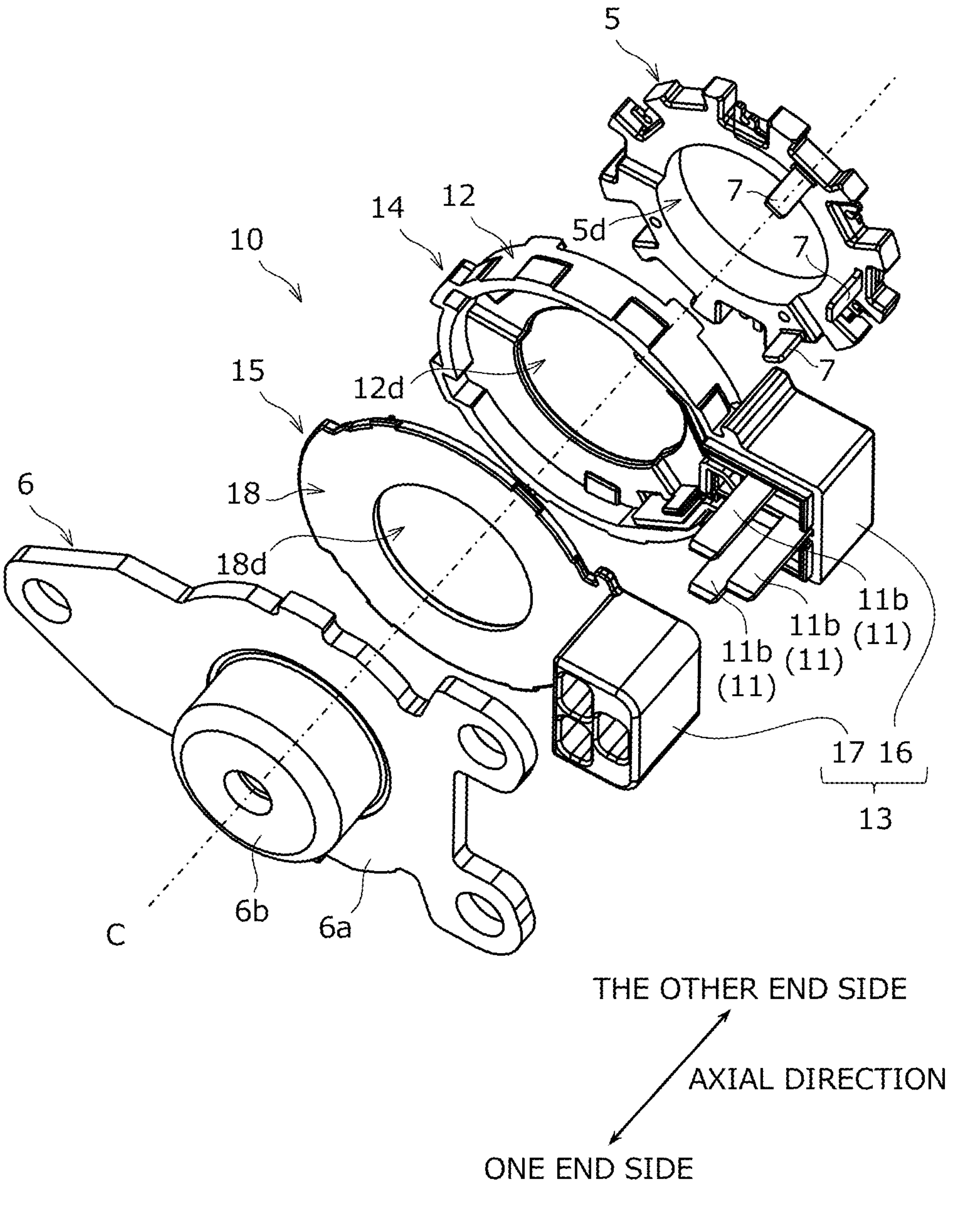
FIG. 2 is an exploded perspective view illustrating a part of components of the brushless motor of FIG. 1.

The housing 4 is made of metal and has a bottomed tubular shape that is open on one end side in an axial direction. As illustrated in FIG. 2, a molded busbar 5, a compatible component 10, and an end bell 6 are fixed in this order from the other end side toward the one end side in the opening on the one end side of the housing 4. The external shape of the housing 4 of the embodiment is cylindrical. However, the shape of the housing 4 is not limiting.

The rotor 2 includes a rotor core (not illustrated) that rotates integrally with the shaft 20, and a cylindrical magnet (not illustrated) that is fixed to the outer peripheral surface of the rotor core. The shaft 20 is a rotary shaft that supports the rotor 2. The shaft 20 is placed in such a manner that an end thereof on the one end side penetrates the molded busbar 5, the compatible component 10, and the end bell 6 and protrudes from the one end side of the housing 4. Consequently, the shaft 20 functions also as an output shaft that takes the output (mechanical energy) of the motor 1 to the outside. The shaft 20 of the embodiment is rotatably supported by a bottom portion of the housing 4 and the end bell 6 via bearings in two places across the rotor core in the axial direction.

The stator 3 is an approximately cylindrical component having, on an inner diameter side thereof, a space where the rotor 2 is placed. The stator 3 includes an annular stator core (not illustrated) fixed in the housing 4, and coils (not illustrated) wound around the stator core via an insulator (not illustrated). The motor 1 of the embodiment is provided with six coils. Phase-U current is supplied to two coils. Phase-V current is supplied to another two coils. Phase-W current is supplied to the remaining two coils.

Figure 3:
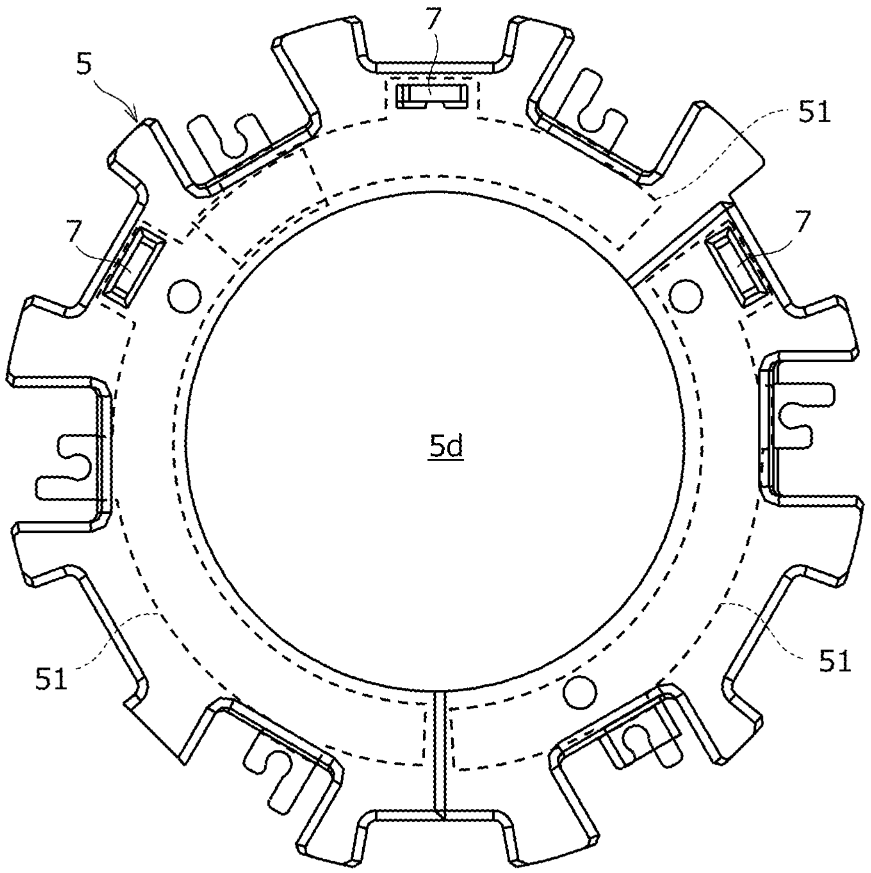
FIG. 3 is a plan view of a molded busbar included in the brushless motor of FIG. 1.

As illustrated in FIG. 3, the molded busbar 5 is configured, including three busbars 51 connecting the coils on a per-phase basis. The three busbars 51 are arc-shaped flat plate members extending in a direction orthogonal to the axial direction, and placed in such a manner as to be displaced (layered) in the axial direction to prevent electrical continuity between the busbars 51. The molded busbar 5 is provided as an insert-molded item obtained by molding the three busbars 51 with resin. In other words, the three busbars 51 are provided as the integral molded busbar 5 molded with resin in the embodiment. The molded busbar 5 has a doughnut shape (annular shape) as viewed in the axial direction, and includes, in the center thereof, a circular hole portion **5*d* that is concentric with the central axis C of the motor 1**.

The busbars 51 are connected, on the one end side thereof, to three output terminals 7 for power supply, respectively. The three output terminals 7 are terminals that are connected to terminals 11, which are described later, of the compatible component 10. The three output terminals 7 extend in the axial direction while being electrically continuous with the busbars 51, respectively. The three output terminals 7 are preferably placed in such a manner as to congregate in a circumferential position where a connector portion 13, which is described later, of the compatible component 10 is located and to be spaced apart from each other. In the embodiment, the three output terminals 7 are provided, evenly spaced apart from each other in a circumferential direction, in the vicinity of the circumferential position where the connector portion 13 is located.

Moreover, in the embodiment, the output terminals 7 extend respectively from the three busbars 51 toward the one end side in the axial direction, and extend further toward the one end side than an end surface on the one end side of the molded busbar 5 as illustrated in FIG. 2. The output terminals 7 and the busbars 51 may be integrated, or may be separate from and not electrically connected to each other. Moreover, the three busbars 51 may not be integrated into the molded busbar 5.

The compatible component 10 is a component for establishing electrical continuity between a power feeding device (not illustrated) that feeds power from the outside to the motor 1 and the output terminals 7, and includes the terminals 11 connected to the power feeding device as illustrated in FIG. 2. A plurality of types of the compatible components 10 that are different in the configuration of the terminals 11 according to the specification of a customer is prepared. One of the plurality of types is applied to the motor 1. The power feeding device may have a function of inputting an operation signal into the motor 1. The configuration of the compatible component 10 is described later.

The end bell 6 is a metal component that is mounted on the one end side of the compatible component 10, and is fixed to the housing 4. The end bell 6 of the embodiment includes a flat portion **6*a* placed on a surface on the one end side of the compatible component 10 (a surface on the one end side of a lid portion 18 included in a cover 15 described later), and an expanded portion 6*b* formed into a bottomed tubular shape centered about the central axis C on the flat portion 6*a*. The expanded portion 6*b* is a portion where an unillustrated bearing is housed. The shape of the end bell 6** is not particularly limiting.

[2. Configurations of Main Elements]

The motor 1 of the embodiment is configured in such a manner that the configuration of the terminals 11 can be easily changed in accordance with customers' specifications. Specifically, the configuration (for example, shape, placement, and size) of the terminals 11 is formed in accordance with the customers' specifications, and a plurality of types of the compatible components 10 including the terminals 11 with different configurations is prepared. One of the plurality of types of the compatible components 10 is supported by (attached to) the housing 4. Consequently, it is possible to comply with the customers' interface demands while using the common main components (basic structure) including the rotor 2, the stator 3, the housing 4, the molded busbar 5, and the shaft 20. Therefore, it seems as if each of the motors 1 is manufactured exclusively for the customer.

Two types of the compatible components 10 that are different in the configuration of the terminals 11 are illustrated by example in the embodiment. An example of the compatible component 10 (hereinafter referred to as the "first compatible component 10A") appears in FIGS. 4 to 6. Another example of the compatible component 10 (hereinafter referred to as the "second compatible component 10B") appears in FIGS. 7 and 8. Two types of the compatible components 10 are illustrated by example here. However, three or more types of the compatible components 10 may be prepared.

In the following description, each portion of the compatible component 10 is described, adding "A" to the end of a reference numeral of each portion of the first compatible component 10A and "B" to the end of a reference numeral of each portion of the second compatible component 10B, when the first compatible component 10A and the second compatible component 10B are distinguished. Moreover, a description is given, omitting the capital alphabet letter at the end, when the first compatible component 10A and the second compatible component 10B are not distinguished.

The compatible component 10 is provided with at least the terminals 11 and a holder portion 12. The terminals 11 are formed in accordance with the customers' specifications as described above. In contrast, the holder portion 12 is a portion that is configured in common (uniformly) regardless of the customers' specifications. The holder portion 12 is placed on the one end side of the busbars 51 in the housing 4, and supported by the housing 4. In other words, the reason why the compatible component 10 can be reassembled to the above basic structure (can be attached in accordance with the specification) is that the compatible component 10 has the common portion, that is, the holder portion 12.

Figure 4:
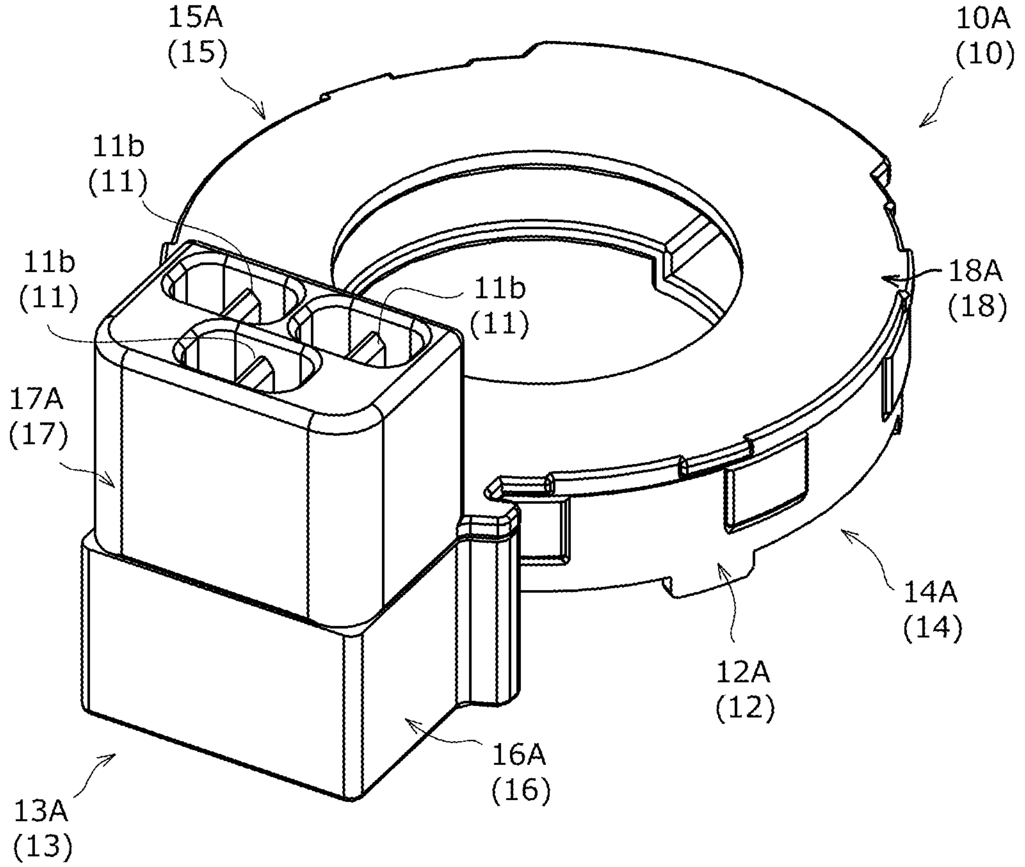
FIG. 4 is a perspective view of an example of a compatible component included in the brushless motor of FIG. 1.
Figure 7:
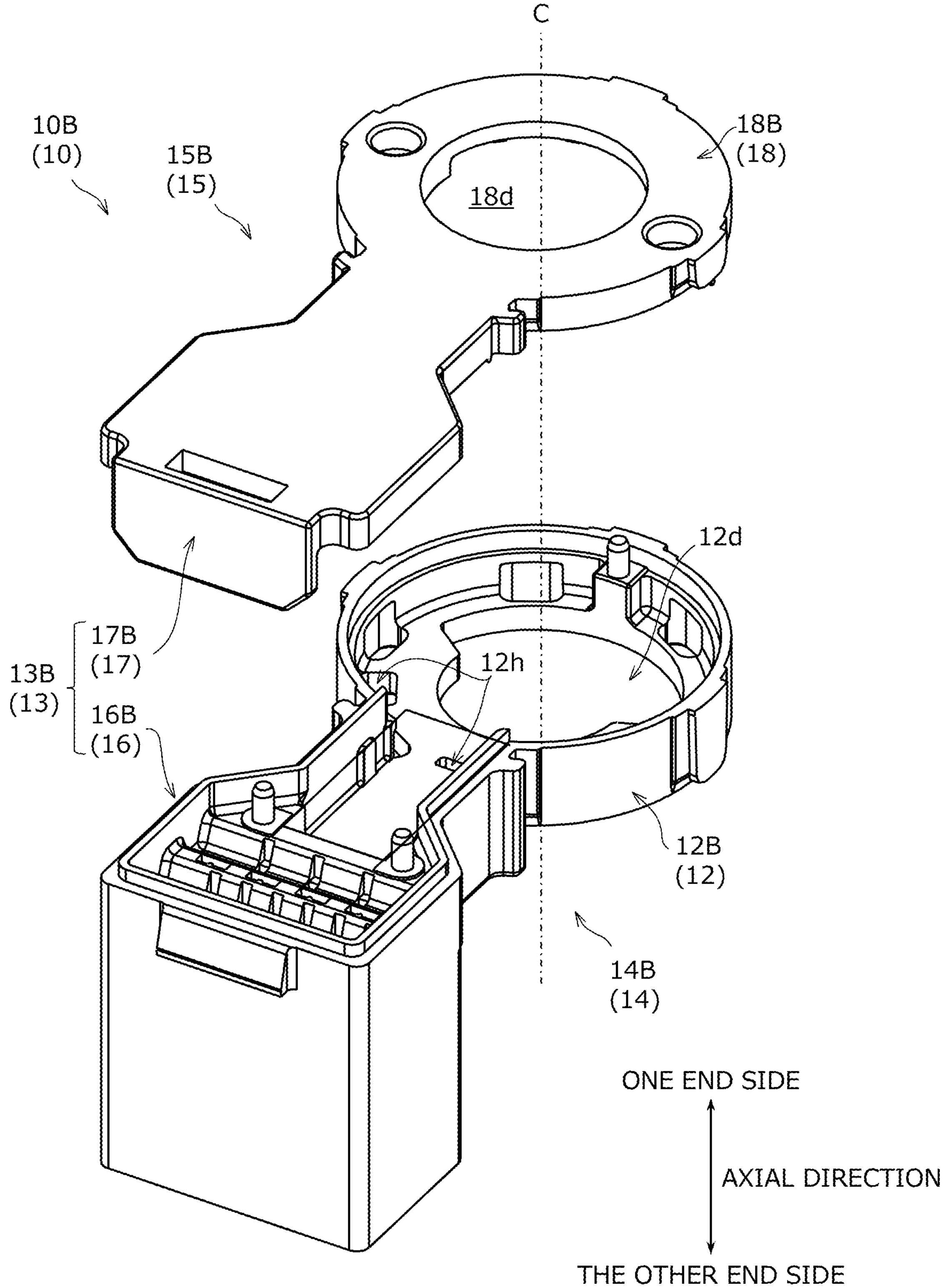
FIG. 7 is an exploded perspective view of components, excluding the terminals, of the compatible component included in the brushless motor of FIG. 1, the view illustrating another example of the compatible component.

As illustrated in FIGS. 4 and 7, the compatible component 10 of the embodiment is provided with the holder portion 12 having an outer shape that can fit within the housing 4, and the connector portion 13 having a shape that can mate to a connector (not illustrated) of the power feeding device. The holder portion 12 is stacked on the one end side of the molded busbar 5 in the axial direction and supported by the housing 4. The connector portion 13 has, for example, a bottomed tubular shape, and is placed adjacent to the housing 4, radially outward of the holder portion 12 and outside the housing 4.

The terminals 11 are, for example, conductive plate-shaped members, and are equal in number to the output terminals 7, in other words, three terminals 11 are provided. The terminals 11 are electrically connected to the output terminals 7, respectively, and are exposed to the outside of the housing 4. Specifically, one end 11*a* (refer to FIG. 6 or 8) of each of the terminals 11 is placed in the holder portion 12, and is electrically connected to the respective output terminal 7. Moreover, the other end 11*b* (refer to FIG. 4 or 8) of the each of the terminals 11 is placed in the connector portion 13, and is exposed to the outside of the housing 4. Consequently, when the connector of the power feeding device is inserted into the connector portion 13, the terminals 11 are electrically connected to the power feeding device to establish electrical continuity between the power feeding device and the output terminals 7.

The connector portion 13 is a portion where the other ends 11*b* (that is, the ends exposed to the outside) of the terminals 11 are placed, and conforms to the configuration of the terminals 11. In other words, the connector portion 13 also has a different configuration according to the type of the compatible component 10.

Figure 5:
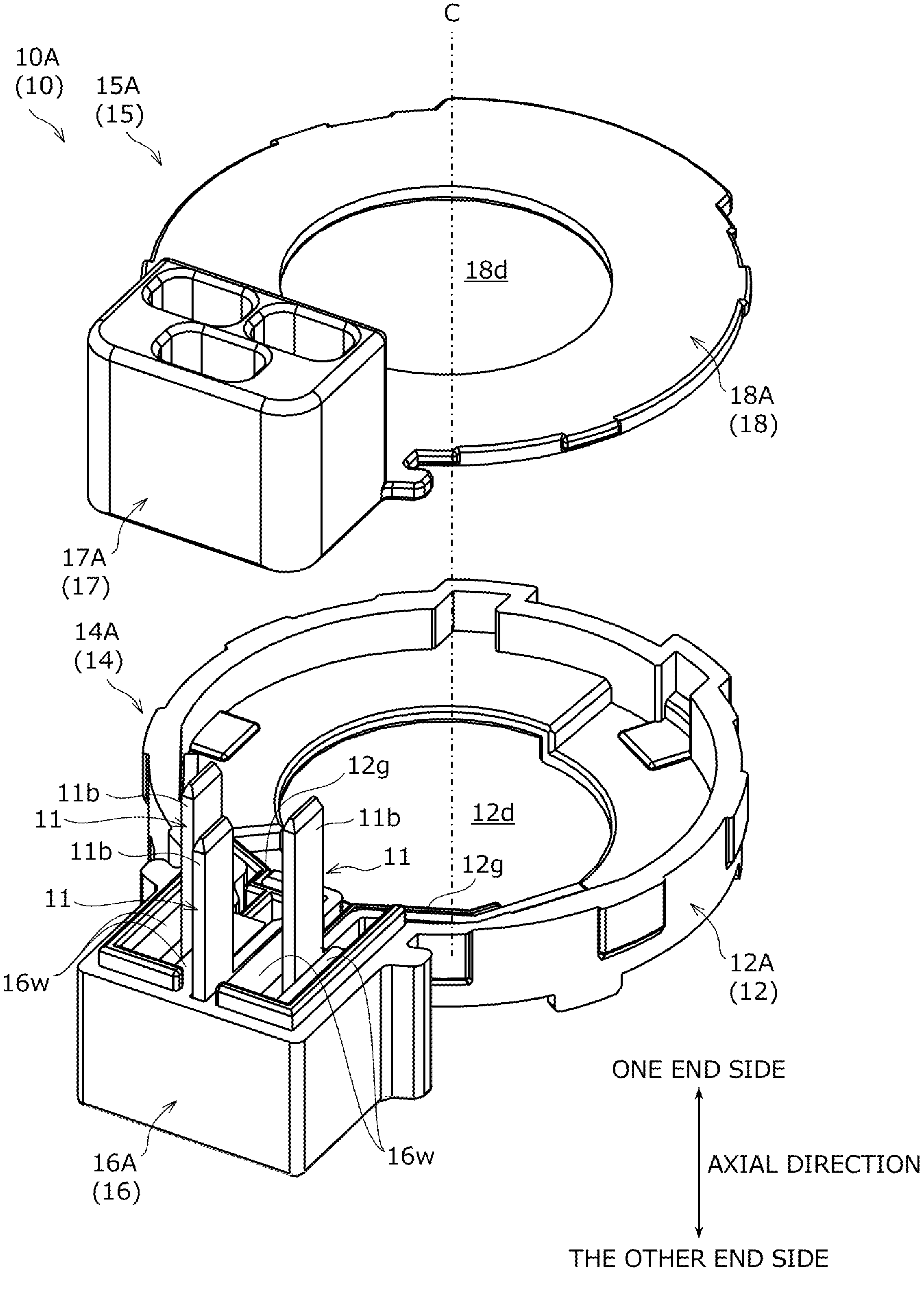
FIG. 5 is an exploded perspective view of the compatible component of FIG. 4.
Figure 8:
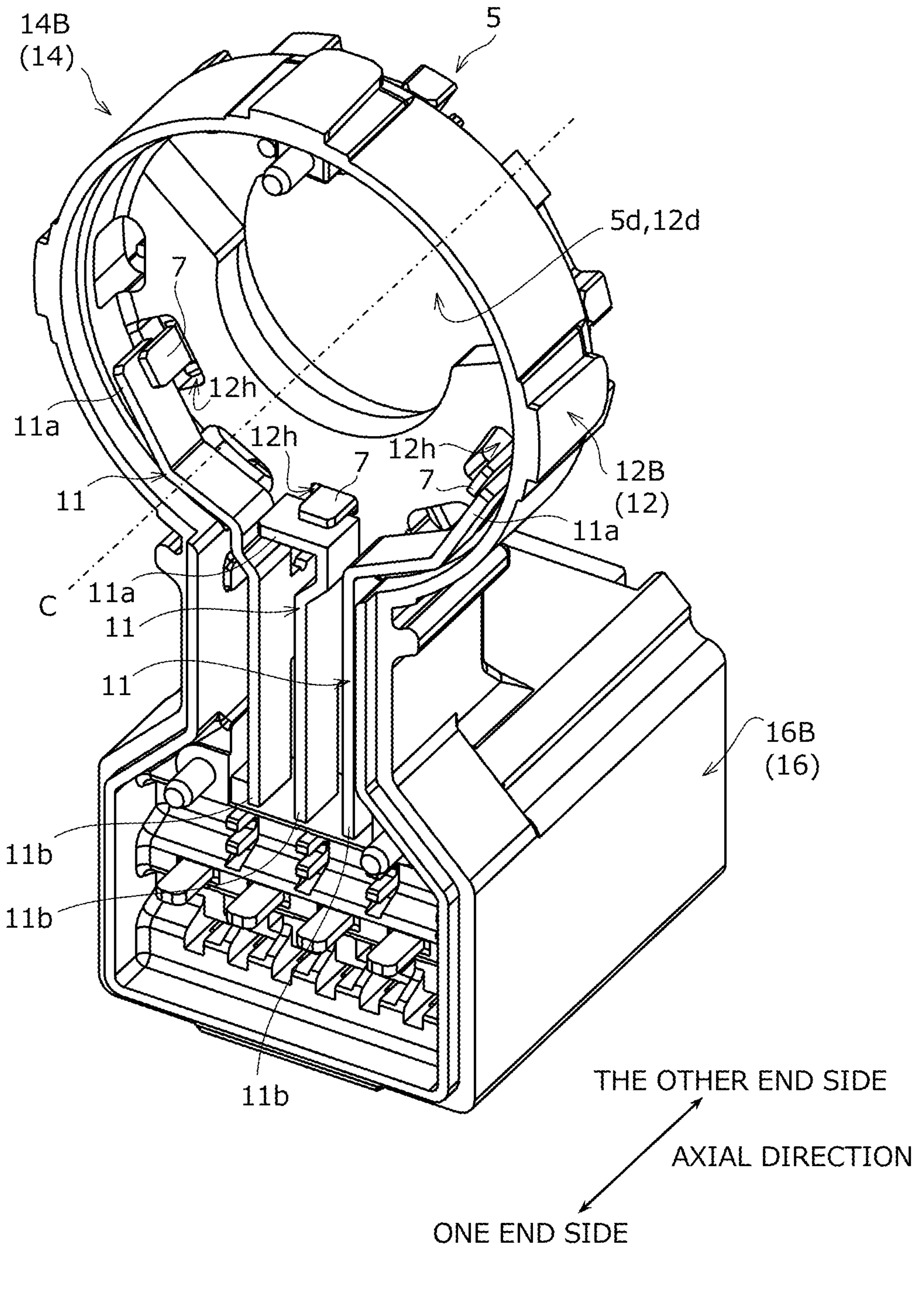
FIG. 8 is a perspective view illustrating a state where the terminal holder included in the compatible component of FIG. 7 is stacked on the molded busbar, the view illustrating a state where the terminal holder is holding the terminals.

As illustrated in FIG. 5 or 7 and 8, the compatible component 10 of the embodiment is formed by assembling three kinds of components including the terminals 11, a terminal holder 14 that holds the terminals 11, and the cover 15 placed on the one end side of the terminal holder 14 in the axial direction. The above-mentioned holder portion 12 is provided to the terminal holder 14. Moreover, the above-mentioned connector portion 13 is formed by assembling a holder-side connector portion 16 of the terminal holder 14 and a cover-side connector portion 17 of the cover 15.

The terminal holder 14 is an insulating (for example, resin) component having a structure that holds the terminals 11, and includes the above-mentioned holder portion 12, and the holder-side connector portion 16 formed integrally with and radially outward of the holder portion 12.

Figure 6:
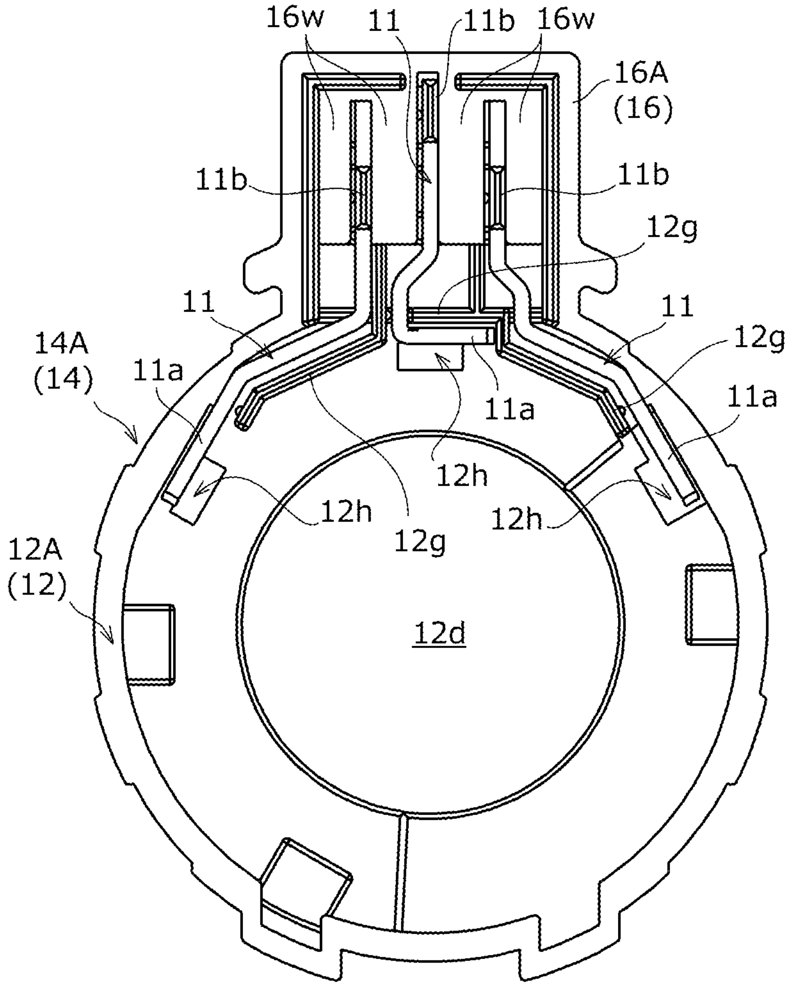
FIG. 6 is a plan view illustrating a state where a terminal holder included in the compatible component of FIG. 4 is holding terminals.

As illustrated in FIGS. 5 and 7, the holder portion 12 of the embodiment has a bottomed cylindrical shape, and is provided with a circular hole portion 12*d* that is concentric with the central axis C of the motor 1, the hole portion 12*d* passing through the center of a bottom portion of the holder portion 12. In other words, the holder portion 12 is configured, including the doughnut-shaped bottom portion as viewed in the axial direction, and a side surface portion standing on the outer edge of the bottom portion. As illustrated in FIGS. 6 and 8, the bottom portion located on the other end side of the holder portion 12 is provided with output terminal holes 12*h* through each of which the respective output terminal 7 is inserted, the output terminal holes 12*h* passing through the bottom portion. The output terminal holes 12*h* are provided, corresponding to the position of the above-mentioned output terminals 7. Three output terminal holes 12*h* are illustrated by example which are provided in such a manner as to congregate in the position of the holder-side connector portion 16 (near the holder-side connector portion 16) serving as the connector portion 13 and to be evenly spaced apart from each other in the circumferential direction. However, the shape and number of the output terminal holes 12*h* are not limiting. For example, the output terminal holes 12*h* may be one single long hole provided along the circumferential direction, and allow inserting all the three output terminals 7 therethrough.

The side surface portion of the holder portion 12 misses a portion connecting to the holder-side connector portion 16. The terminals 11 are placed astride the missing portion, and held by the terminal holder 14. For example, as illustrated in FIGS. 5 and 6, the first compatible component 10A is provided with a linear guide portion 12*g* protruding from the bottom portion of the holder portion 12A toward the one end side as viewed in the axial direction. The terminals 11 are placed along the guide portion 12*g* in contact with the output terminals 7 and, therefore, are held by the terminal holder 14A.

The holder-side connector portion 16 serves as a part of the connector portion 13 as described above, and the shapes of the holder-side connector portions 16 vary according to the type of the compatible component 10. For example, the holder-side connector portion 16A of the first compatible component 10A serves as a bottom portion of the bottomed tubular connector portion 13A. As illustrated in FIGS. 5 and 6, the holder-side connector portion 16A has a box shape including a bottom wall extending radially outward from the bottom portion on the other end side of the holder portion 12A, and a side wall standing on the outer edge of the bottom wall. The holder-side connector portion 16A is provided with a positioning wall 16*w* that determines the positions of the other ends 11*b* of the terminals 11 in such a manner that the positioning wall 16*w* protrudes from the bottom wall of the holder-side connector portion 16A toward the one end side. As illustrated in FIG. 6, the guide portion 12*g* of the holder portion 12A may extend on the bottom wall of the holder-side connector portion 16A. Moreover, the holder-side connector portion 16B of the second compatible component 10B serves as a tubular portion of the bottomed tubular connector portion 13B. As illustrated in FIGS. 7 and 8, the holder-side connector portion 16B is longer in axial dimension than the side surface portion of the holder portion 12B, and the outer shape of the holder-side connector portion 16B is formed into an approximately rectangular tubular shape extending toward the other end side in the axial direction.

The cover 15 is a component that covers the terminal holder 14 from the one end side in the axial direction to prevent the terminals 11 from being electrically continuous with other components (for example, the end bell 6), and includes the lid portion 18 (an insulating lid portion), and the cover-side connector portion 17 provided radially outward of the lid portion 18. The cover 15 is a component formed of an insulating material (for example, resin), and is formed integrally with the lid portion 18 and the cover-side connector portion 17.

The lid portion 18 is a portion that covers the holder portion 12 of the terminal holder 14 from the one end side in the axial direction, and is formed into a shape that matches the outer shape (a doughnut shape as viewed in the axial direction in the embodiment) of the holder portion 12. In other words, the lid portion 18 of the embodiment has a disc shape as viewed in the axial direction, is formed into a doughnut shape including, in the center thereof, a circular hole portion 18*d* that is concentric with the central axis C of the motor 1, and is placed on an end surface on the one end side of the side surface portion of the holder portion 12.

The cover-side connector portion 17 serves as the connector portion 13 in combination with the holder-side connector portion 16. The cover-side connector portion 17 is different in shape according to the type of the compatible component 10, and is formed into a shape that matches the shape of the holder-side connector portion 16 (a shape that allows being assembled to the holder-side connector portion 16). In the embodiment, the holder-side connector portion 16A of the first compatible component 10A is the bottom portion of the connector portion 13. Therefore, the cover-side connector portion 17A is formed in such a manner as to serve as the tubular portion of the connector portion 13 as illustrated in FIG. 5. Moreover, the holder-side connector portion 16B of the second compatible component 10B is the tubular portion of the connector portion 13. Therefore, the cover-side connector portion 17B is formed in such a manner as to serve as the bottom portion of the connector portion 13 as illustrated in FIG. 7.

In the embodiment, as illustrated in FIG. 5, the other ends 11*b* of the three terminals 11 of the first compatible component 10A are placed in such a manner that the other end 11*b* of one of the terminals 11 is located radially outward of the other ends 11*b* of the other two terminals 11, in other words, in such a manner as to form a triangle as viewed in the axial direction. The cover-side connector portion 17A of the first compatible component 10A includes three hole portions that surround the other ends 11*b* of the terminals 11 respectively, and the three hole portions are provided in such a manner as to form a triangle, accordingly.

[3. Functions and Effects]

(1) According to the above-mentioned motor 1, a plurality of types of the compatible components 10 that have the common holder portion 12 and are different in the configuration of the terminals 11 is prepared. One of the plurality of types of the compatible components 10 is supported by the housing 4. In this manner, the basic structure including the rotor 2, the stator 3, and the housing 4 does not change, and a plurality of types of the compatible components 10 after the output terminals 7 is prepared to have a compatible configuration. Therefore, even if the interface demands vary according to the customer, it is possible to efficiently and easily comply with the demands. In other words, even if the interface demands vary according to the customer, the necessary bare minimum of components, that is, only the compatible component 10, is replaced. Therefore, it is possible to efficiently and easily meet a requested interface specification.

Moreover, the compatible component 10 is not provided as an attachment that is retrofitted to the housing 4, but assembled to the motor 1 by the holder portion 12 being supported by the housing 4 in the housing 4. Hence, a component (attachment) that is handled separately from the motor main body can be omitted; therefore, the handling efficiency of the motor 1 can be improved. Furthermore, the holder portion 12 of the compatible component 10 is placed inside the housing 4; therefore, there is no dead space, which leads to a reduction in the size of the motor 1. Moreover, the compatible component 10 is assembled into the motor 1. Hence, outwardly, the motor 1 does not include an attachment separate from the motor main body, in other words, the motor 1 looks specifically for the specification; therefore, the market value of the motor 1 can be increased.

(2) According to the above-mentioned motor 1, each of the three output terminals 7 is provided, extending from the respective busbar 51 toward the one end side in the axial direction. In this manner, the each of the output terminals 7 is formed as a joint component that is integrated with the respective busbar 51. Accordingly, it is possible to promote a simplification of the structure and a reduction in the number of components. In particular, the three busbars 51 are also integrated into the one molded busbar 5 in the above-mentioned motor 1. Therefore, it is possible to further promote a simplification of the structure and a reduction in the number of components. Moreover, each of the holder portions 12 of the plurality of types of the compatible components 10 includes the output terminal holes 12*h* through each of which the respective output terminal 7 is inserted, and is stacked on the molded busbar 5. In this manner, the commonality of the holder portion 12 is promoted; therefore, the compatible component 10 that can be reassembled with a simple configuration can be achieved.

(3) The three output terminals 7 are provided in such a manner as to congregate in the circumferential position where the connector portion 13 of the compatible component 10 is located and to be spaced apart in the circumferential direction. In this manner, the three output terminals 7 are configured in such a manner as to congregate in the vicinity of the connector portion 13 and to be spaced apart from each other in the circumferential direction. Therefore, the terminals 11 can be reduced in length without being in contact with each other. In particular, in the above-mentioned motor 1, the three output terminals 7 are provided at regular intervals in the circumferential direction. Therefore, it is possible to simplify the configuration of the terminals 11 and to easily carry out wiring.

(4) The connector portion 13 of the compatible component 10 is different in shape according to the type of the compatible component 10. In this manner, not only the configuration of the terminals 11 but also the configuration of the connector portion 13 is made changeable. Therefore, even if demands for the interface (connector) vary according to the customer, it is possible to efficiently and easily comply with the demands.

(5) The compatible component 10 includes the insulating lid portion 18 that covers the holder portion 12 from the one end side in the axial direction. Consequently, the terminals 11 can be insulated by the lid portion 18 from other components simply by placing the compatible component 10. Therefore, the assembly efficiency of the motor 1, and the reassembly efficiency of the compatible component 10 can be improved. Moreover, the lid portion 18 is formed integrally with the cover-side connector portion 17 that is a part of the connector portion 13. Therefore, when the lid portion 18 is provided, insulation between the terminals 11 and other components can be achieved without increasing the number of components.

[4. Others]

The configuration of the motor 1 described in the above-mentioned embodiment is an example, and is not limiting. For example, the lid portion 18 of the compatible component 10 may be omitted. The shapes of the holder portion 12 and the lid portion 18 of the compatible component 10 as viewed in the axial direction are not limited to a doughnut shape and may be, for example, an arc shape. Moreover, the compatible component 10 may not include three kinds of components including the terminals 11, the terminal holder 14, and the cover 15. The compatible component 10 may be configured as a single component obtained by insert molding the terminals 11 in such a manner as to have a shape that matches the terminal holder 14 and the cover 15.

The configurations of the terminals 11 and the connector portions 13 of the plurality of types of the compatible components 10 are not limited to the above-mentioned configurations, either. For example, the above-mentioned first compatible component 10A where the other ends 11*b* of the three terminals 11 are placed in such a manner as to form a triangle is illustrated by example. However, for example, a compatible component where the other ends of the three terminals are aligned in the radial direction, or a compatible component where the other ends of the three terminals are aligned along the circumferential direction may be prepared. The connector portion may have a shape including three hole portions aligned in the radial direction if the other ends of the three terminals are aligned in the radial direction, and may have a shape including three hole portions aligned along the circumferential direction if the other ends of the three terminals are aligned along the circumferential direction.

The three output terminals 7 may be provided separately from the molded busbar 5 including the busbars 51. The three output terminals 7 may not be provided in such a manner as to congregate in the circumferential position where the connector portion 13 of the compatible component 10 is located, and the intervals between the three output terminals 7 may be different from each other. The plurality of types of the compatible components 10 is simply required to have the common holder portion 12 that accommodates the positions of the three output terminals 7.

The motor 1 may include a Hall sensor that detects the rotary position of the rotor 2. In this case, a signal line that is connected to the Hall sensor may be installed in the compatible component 10. The type of motor is not particularly limiting, and may be an outer rotor brushless DC motor where a rotor is placed radially outward of a stator.

DESCRIPTION OF REFERENCE SIGNS

1 motor (brushless motor)
2 rotor
3 stator
4 housing
5 molded busbar
7 output terminal
10 compatible component
10A first compatible component (compatible component)
10B second compatible component (compatible component)
11 terminal
11*b* the other end (end portion exposed to the outside)
12, 12A, 12B holder portion
12*h* output terminal hole (hole portion)
13 connector portion
14, 14A, 14B terminal holder
15, 15A, 15B cover
18 lid portion (insulating lid portion)
51 busbar

What is claimed is:

1. A brushless motor where a stator and a rotor are housed in a housing, comprising:

three busbars located on one end side of the stator in an axial direction, the three busbars connecting three-phase coils provided to the stator on a per-phase basis;

three output terminals on the one end side of the busbars, the three output terminals extending in the axial direction while being electrically continuous with the busbars; and a compatible component configured to reassemblably connect to the busbars and the output terminals, the compatible component including:

a holder portion placed on the one end side of the busbars in the housing and supported by the housing;

terminals each electrically connected to the respective output terminal and exposed to an outside of the housing, a connector portion where end portions, which are exposed to the outside, of the terminals are placed, and an insulating lid portion having a shape covering the holder portion from the one end side, the insulating lid portion being formed integrally with a part of the connector portion, wherein the compatible component is configured to connect the terminals to the output terminals by connecting the compatible component to the housing, and wherein the connector portion is placed adjacent to the housing on the outside, wherein a plurality of types of the compatible components that has the common holder portion and are different in the configuration of the terminals is prepared, and one of the plurality of types is supported by the housing.

2. The brushless motor according to claim 1, wherein each of the output terminals extends from the respective busbar toward the one end side, and the holder portion is stacked on the one end side of the three busbars, and includes a hole portion through which the output terminals are inserted, the hole portion passing through the holder portion in the axial direction.

3. The brushless motor according to claim 1, wherein the three output terminals are provided in such a manner as to congregate in a circumferential position where the connector portion is located and to be spaced apart in a circumferential direction.

4. The brushless motor according to claim 3, wherein the connector portion has a different configuration according to the type of the compatible component.

* * * * *